United States Patent
Konnai

(10) Patent No.: US 12,281,020 B2
(45) Date of Patent: *Apr. 22, 2025

(54) METAHALLOYSITE POWDER AND METAHALLOYSITE POWDER PRODUCTION METHOD

(71) Applicant: JFE MINERAL COMPANY, LTD., Tokyo (JP)

(72) Inventor: Hidefumi Konnai, Tokyo (JP)

(73) Assignee: JFE MINERAL COMPANY, LTD., Tokyo (JP)

(*) Notice: Subject to any disclaimer, the term of this patent is extended or adjusted under 35 U.S.C. 154(b) by 798 days.

This patent is subject to a terminal disclaimer.

(21) Appl. No.: 17/049,443

(22) PCT Filed: Apr. 24, 2019

(86) PCT No.: PCT/JP2019/017357
§ 371 (c)(1),
(2) Date: Oct. 21, 2020

(87) PCT Pub. No.: WO2019/208612
PCT Pub. Date: Oct. 31, 2019

(65) Prior Publication Data
US 2021/0261421 A1    Aug. 26, 2021

(30) Foreign Application Priority Data

Apr. 25, 2018    (JP) .................... 2018-084243

(51) Int. Cl.
*C01B 33/40* (2006.01)
*B82Y 40/00* (2011.01)

(52) U.S. Cl.
CPC ............ *C01B 33/40* (2013.01); *B82Y 40/00* (2013.01); *C01P 2004/03* (2013.01);
(Continued)

(58) Field of Classification Search
CPC ......... C01B 33/40; C01B 33/26; B82Y 40/00; C01P 2004/03; C01P 2004/13;
(Continued)

(56) References Cited

U.S. PATENT DOCUMENTS

2007/0202061 A1    8/2007    Riedlinger et al.
2009/0092836 A1    4/2009    Geckeler et al.
(Continued)

FOREIGN PATENT DOCUMENTS

CN    1746216 A    3/2006
CN    101284670 A    10/2008
(Continued)

OTHER PUBLICATIONS

Zivica et al (High strength metahalloysite based geopolymer, Composites Part B, 2014) (Year: 2014).*
(Continued)

*Primary Examiner* — Michael Forrest
*Assistant Examiner* — Logan Edward Laclair
(74) *Attorney, Agent, or Firm* — Buchanan Ingersoll & Rooney PC

(57) ABSTRACT

Provided are a novel metahalloysite powder and a production method thereof, which are not present in the prior art. The metahalloysite powder is a powder which comprises granules of aggregated metahalloysite comprising metahalloysite nanotubes, which are tube-shaped metahalloysite. The production method comprises a step of preparing a halloysite slurry which comprises halloysite nanotubes, a step for formulating a powder from the slurry, and a step for firing the formulated powder at a firing temperature of 500° C. or above.

9 Claims, 9 Drawing Sheets

(52) U.S. Cl.
CPC ...... *C01P 2004/04* (2013.01); *C01P 2004/13* (2013.01); *C01P 2004/61* (2013.01); *C01P 2004/62* (2013.01); *C01P 2006/12* (2013.01); *C01P 2006/14* (2013.01); *C01P 2006/16* (2013.01)

(58) Field of Classification Search
CPC .............. C01P 2004/61; C01P 2004/62; C01P 2006/12; C01P 2006/14; C01P 2006/16; C01P 2002/72; C01P 2004/04; C01P 2004/50; C01P 2006/17; C01P 2006/21
See application file for complete search history.

(56) References Cited

U.S. PATENT DOCUMENTS

| | | | |
|---|---|---|---|
| 2012/0107214 A1 | 5/2012 | Suh et al. | |
| 2020/0062603 A1 | 2/2020 | Konnal et al. | |

FOREIGN PATENT DOCUMENTS

| | | | |
|---|---|---|---|
| CN | 101759195 A | | 6/2010 |
| CN | 102303861 A | | 1/2012 |
| CN | 102398902 A | | 4/2012 |
| CN | 105789575 A | | 7/2016 |
| EP | 0325487 A1 | | 7/1989 |
| JP | 2-4452 A | * | 1/1990 |
| JP | 02004452 A | | 1/1990 |
| JP | 200991236 A | * | 4/2009 |
| JP | 2009091236 A | | 4/2009 |
| JP | 2009513709 A | * | 4/2009 |
| KR | 20180006553 A | | 1/2018 |
| WO | 2015165061 A1 | | 11/2015 |
| WO | 2018079656 A1 | | 5/2018 |

OTHER PUBLICATIONS

Tan et al (Natural halloysite nanotubes as mesoporous carriers for the loading of ibuprofen, Microporous and Mesoporous Materials , 2013) (Year: 2013).*

Han, L., et al., "Study on Purification of Halloysite Nanotubes," Aug. 31, 2011, Conservation and Utilization of Mineral Resources, No. 4, 7 pages.

Wang, Q., "Study on Surface Modification of Halloysite Nanotubes and Properties of Supported Pt Nanocatalyst," Jan. 15, 2016, 12 pages, Chinese Master's Theses Full-text Database, Engineering Science and Technology, vol. 1.

Chinese Office Action with Search Report for Chinese Application No. 201980026396.8, dated Nov. 1, 2022, 8 pages.

International Search Report and Written Opinion for International Application No. PCT/JP2019/017357, dated Jul. 2, 2019, 4 pages.

Zivica, V. et al., "High strength metahalloysite based geopolymer," vol. 57, Sep. 26, 2013, pp. 155-165, XP028775746, Composites: Part B, Elsevier, Amsterdam, NL.

Raghdi, A. et al., "Mullite-zirconia composites prepared from halloysite reaction sintered with boehmite and zirconia," vol. 146, May 31, 2017, pp. 70-80, XP085136622, Applied Clay Science, Elsevier, Amsterdam, NL.

Yuan, P., et al., "Changes in structure, morphology, porosity, and surface activity of mesoporous halloysite nanotubes under heating," vol. 60(6), Dec. 1, 2012, pp. 561-573, XP055783895, Clays and Clay Minerals.

Liu, M., et al., "Recent advance is research on halloysite nanotubes-polymer nanocomposite," vol. 39(8), Apr. 24, 2014, pp. 1498-1525, XP029040017, Progress in Polymer Science, Pergamon Press, Oxford, GB.

Yuan, P., et al., "Properties and applications of halloysite nanotubes: recent research advances and future prospects," vol. 112, May 25, 2015, pp. 75-93, XP029187493, Applied Clay Science, Elsevier, Amsterdam, NL.

Extended European Search Report for European Application No. 19 792 629.8, dated Mar. 19, 2021, 11 pages.

Japanese Office Action for Japanese Application No. 2020-515509, dated Jun. 15, 2021 with Concise Statement of Relevance of Office Action, 3 pages.

Chengshan, J. et al., "Application of Guizhou Kaolin in Cracking Catalyst", Proceedings of the Sixth Annual Meeting of the FCC Collaborative Group, SINOPEC Catalytic Cracking Cooperative Group, Feb. 28, 1998, 8 pages with translation.

Chinese Office Action with Search Report for Chinese Application No. 201980026396.8, dated Apr. 20, 2023, 9 pages.

Chinese Office Action with Search Report for Chinese Application No. 201980026442.4, dated Nov. 23, 2022, 9 pages.

International Search Report and Written Opinion for International Application No. PCT/JP2019/017471, dated Jul. 2, 2019, 5 pages.

Korean Office Action for Korean Application No. 10-2020-7029815, dated Jul. 14, 2022, with Concise Statement of Relevance of Office Action, 6 pages.

Zhang et al., "Metal oxide nanoparticles deposited onto carbon-coated halloysite nanotubes", Applied Clay Science 95 (2014) 252-259.

Non Final Office Action for U.S. Appl. No. 17/049,438, mailed Oct. 3, 2023, 29 pages.

Extended European Search Report for European Application No. 19 793 214.8, dated Mar. 19, 2021, 7 pages.

* cited by examiner

METAHALLOYSITE POWDER AND METAHALLOYSITE POWDER PRODUCTION METHOD

CROSS REFERENCE TO RELATED APPLICATIONS

This is the U.S. National Phase application of PCT/JP2019/017357, filed Apr. 24, 2019, which claims priority to Japanese Patent Application No. 2018-084243, filed Apr. 25, 2018, the disclosures of these applications being incorporated herein by reference in their entireties for all purposes.

FIELD OF THE INVENTION

The present invention relates to metahalloysite powder and a method of producing metahalloysite powder.

BACKGROUND OF THE INVENTION

A halloysite nanotube that is tube-shaped halloysite has been used for various applications, taking advantage of the shape thereof (for example, see Patent Literature 1).

PATENT LITERATURES

Patent Literature 1: JP 2009-91236 A

SUMMARY OF THE INVENTION

In recent years, in the hope of expanding the applications, there are demands for development of materials having new fine structures. The present inventor has focused on powder of metahalloysite that is a variant of halloysite (metahalloysite powder).

Aspects of the present invention have been made in view of the above and aim at providing unprecedented, novel metahalloysite powder and a method of producing the same.

The present inventor has made an intensive study to achieve the foregoing objects. As a result, the inventor found that granules obtained by, for example, spray-drying a slurry including a halloysite nanotube and subsequently firing the resultant at a predetermined temperature have become metahalloysite, and aspects of the present invention have been completed.

Specifically, aspects of the present invention provide the following [1] to [11].

[1] Metahalloysite powder comprising a granule that is an aggregate of metahalloysite including a metahalloysite nanotube that is tube-shaped metahalloysite.

[2] The metahalloysite powder according to [1], wherein the granule includes a first pore derived from a tube hole of the metahalloysite nanotube, and a second pore different from the first pore.

[3] The metahalloysite powder according to [2], wherein a differential pore distribution determined from a nitrogen adsorption isotherm by the BJH method exhibits two or more pore size peaks in a range from 10 to 100 nm.

[4] The metahalloysite powder according to any one of [1] to [3], wherein an average particle size is from 0.5 to 200 µm.

[5] The metahalloysite powder according to any one of [1] to [4], wherein a BET specific surface area is not less than 10 $m^2/g$.

[6] The metahalloysite powder according to any one of [1] to [5], wherein an average pore size is not less than 11.0 nm.

[7] The metahalloysite powder according to any one of [1] to [6], wherein a total pore area is not less than 12.0 $m^2/g$.

[8] The metahalloysite powder according to any one of [1] to [7], wherein a total pore volume is not less than 0.10 $cm^3/g$.

[9] The metahalloysite powder according to any one of [1] to [8], wherein the granule that has been immersed in pure water for 24 hours to contain water has a breaking strength of not less than 7.6 MPa.

[10] A method of producing the metahalloysite powder according to any one of [1] to [9], the method comprising: a step of preparing a slurry of halloysite containing a halloysite nanotube, a step of preparing powder from the slurry, and a step of firing the prepared powder at a firing temperature of not lower than 500° C.

[11] The method of producing the metahalloysite powder according to [10], wherein the step of preparing powder from the slurry is a step of spray-drying the slurry.

Aspects of the present invention provide unprecedented, novel metahalloysite powder and a method of producing the same.

DETAILED DESCRIPTION OF EMBODIMENTS OF THE INVENTION

Figure 1:
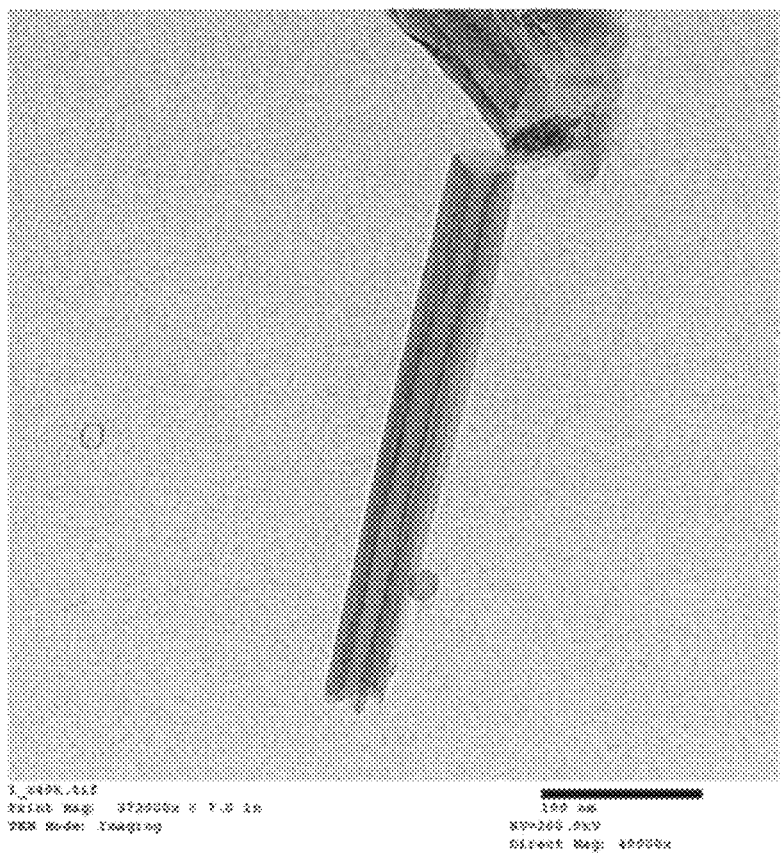
FIG. 1 is a TEM image of a dispersed phase recovered after centrifugation.

The metahalloysite powder and the method of producing the metahalloysite powder according to aspects of the present invention will be described below.

The numerical ranges indicated using "(from) . . . to . . . " include the former number as the lower limit value and the latter number as the upper limit value.

[Summary of Halloysite]

Halloysite is a clay mineral represented by $Al_2Si_2O_5(OH)_4 \cdot 2H_2O$, or $Al_2Si_2O_5(OH)_4$.

Halloysite assumes various shapes such as a tubular shape (hollow tubular shape), a spherical shape, an angular lump shape, a plate-like shape, and a sheet-like shape.

The inner diameter of a halloysite nanotube (the diameter of a tube hole), which halloysite nanotube is a tube-shaped (hollow tube-shaped) halloysite, is approximately from 10 to 20 nm, for example. The outer surface of the halloysite nanotube is mainly composed of silicate ($SiO_2$), and the inner surface of the halloysite nanotube is mainly composed of alumina ($Al_2O_3$).

[Description of Metahalloysite]

"Metahalloysite" is the dehydrated halloysite, i.e., halloysite represented by $Al_2Si_2O_5(OH)_4$ from which OH was removed to assume a low-crystalline form, and is a term that has been conventionally, generally or idiomatically used to refer to a variant of halloysite.

Nonetheless, in accordance with aspects of the present invention, "metahalloysite" is defined as "a product obtained by firing halloysite at a specific firing temperature." The "specific firing temperature" is, for example, not lower than 500° C., preferably not lower than 500° C. and not higher than 1,000° C., more preferably not lower than 500° C. and not higher than 900° C., yet more preferably not lower than 500° C. and lower than 900° C., particularly preferably not lower than 500° C. and not higher than 850° C., and most preferably not lower than 500° C. and not higher than 800° C.

As shown in the XRD patterns in FIG. 17 to be described later, when halloysite is fired at, for example, 400° C. or 450° C., the diffraction line of halloysite does not differ from that of the unfired case.

In the meantime, in a case where halloysite is fired at 500° C., 600° C., 700° C., 800° C., 900° C. or 1,000° C., peaks representing halloysite that are supposed to appear around, for example, $2\theta=12°$ and $2\theta=25°$ disappear, and halloysite assumes the form of low-crystalline. In addition, a broad peak can be seen around $2\theta=20°$. Such the XRD pattern indicates the presence of metahalloysite.

In a case where halloysite is fired at 900° C. or 1,000° C., in addition to those representing metahalloysite, peaks representing $\gamma$-$Al_2O_3$ also appear.

The chemical composition of metahalloysite has the same Al/Si ratio as that of the foregoing halloysite. Hence, it is virtually impossible to distinguish metahalloysite from halloysite and directly identify metahalloysite based on the chemical composition.

Other than the above, in order to find an indicator for identifying the metahalloysite characteristics using other methods or apparatuses, it would require so many repetitions of experimentation, which is too far from realization.

Meanwhile, a "metahalloysite nanotube" is "tube-shaped metahalloysite" and can be regarded as a "product obtained by firing a halloysite tube at a specific firing temperature."

[Method of Producing Metahalloysite Powder]

Prior to description of the metahalloysite powder according to aspects of the present invention, an embodiment of the method of producing the metahalloysite powder according to aspects of the present invention (hereinafter, referred to as "method of producing the metahalloysite powder according to aspects of the present invention" or simply "production method according to aspects of the present invention") is first described.

The production method according to aspects of the invention is a method of producing the metahalloysite powder according to aspects of the present invention to be described later and includes at least a step of preparing a slurry of halloysite including a halloysite nanotube (slurry preparation step), a step of preparing powder from the slurry (powder preparation step) and a step of firing the prepared powder at a firing temperature of not lower than 500° C.

Below, a preferred embodiment of the production method according to aspects of the invention is described.

<Slurry Preparation Step>

The slurry preparation step is not particularly limited as long as a slurry, in which halloysite including a halloysite nanotube is dispersed in a dispersion medium such as water, can be prepared. A preferred embodiment of the slurry preparation step will be described below. In the embodiment described below, a dispersed phase recovered after centrifugation corresponds to a slurry prepared in the slurry preparation step.

<<Raw Material (Iide Clay)>>

The Osodani factory (Osodani, Iidemachi, Nishiokitama-gun Yamagata) of the Iide mining works of JFE MINERAL Co., LTD. produces silica sand from deposits including silica sand and clay. Clay components (hereinafter, referred to as "Iide clay" for convenience) produced as a by-product in the process of purifying the silica sand can be used as a raw material.

Iide clay has plasticity and a water content of approximately 40 mass %. Iide clay is mainly composed of halloysite and fine sand (quartz) represented by $SiO_2$. Iide clay may further include a small amount of a cationic polymer flocculant.

Iide clay including water (including approximately 40 mass % of water) may be used as it is, or can be dried under the sun light in a natural manner for use (including semi-dried clay). Water-containing or semi-dried Iide clay may be dried using equipment.

Dried Iide clay may be pulverized, and further subjected to dry purification, classification, magnetic separation, color sorting, or the like as necessary, and used.

It goes without saying that, in addition to use of Iide clay which is rich in halloysite, a raw ore thereof can be also used.

<<Preparation of First Slurry>>

Next, a slurry (first slurry) in which Iide clay is dispersed in water is prepared. The method of dispersing Iide clay in water is not particularly limited, and, for example, known apparatuses such as a high-speed mixer, a disperser, a bead mill, and a homomixer can be used.

The solid content concentration of the first slurry is not particularly limited, and for example, is from 5 to 20 mass %.

<<Removal of Coarse Particles>>

Next, coarse particles are removed by, for example, sieving the first slurry. The aperture size of the sieve that is used is, for example, from 25 to 100 μm. As a sieve, for example, a sieve for Japanese Industrial Standards (JIS) test may be used. A common large-size wet sieving apparatus may be used in mass production. Other than the use of a sieve, coarse particles may be removed by performing sedimentation separation or using a wet type cyclone.

<<Filtering>>

Next, the first slurry from which the coarse particles have been removed, is filtered with suction using a filter, and the resulting dehydrated cake is recovered. In mass production, a dehydrator such as a filter press or an Oliver filter may be used, for example.

This filtering may be omitted, and the slurry from which coarse particles have been removed may be directly used as a second slurry described later. In this case, a dispersant may be added as necessary.

<<Preparation of Second Slurry>>

Water is added to the dehydrated cake, and the mixture was stirred at a high speed to produce a slurry (second slurry) in which Iide clay from which coarse particles have been removed is dispersed in water. As a dispersing machine, for example, known apparatuses such as a high-speed mixer, a disperser, a bead mill, and a homomixer may be used similarly to the case of the first slurry.

The solid content concentration of the second slurry is not particularly limited, and, for example, is from 5 to 30 mass %.

The dispersion state of particles (Iide clay) in the slurry significantly influences the precision of subsequent centrifugation. Thus, a surfactant is preferably added as a dispersant in preparing the second slurry.

In a case where Iide clay includes a cationic polymer flocculant, an anionic surfactant is preferably used as the surfactant. In particular, a polymer anionic surfactant (anionic polymeric surfactant) is preferably used from the perspective of obtaining a stable slurry by using a small amount of the surfactant.

Even in a case where Iide clay does not include a cationic polymer flocculant, an anionic polymeric surfactant is preferably added from the perspective of maintaining the highly dispersed state of the obtained second slurry and facilitating stable removal of fine sand in centrifugation described later.

Addition of the anionic polymeric surfactant can provide a second slurry having a higher concentration, and thus provides an effect of enhancing productivity in drying using, for instance, a spray-dryer described later.

Specific examples of the anionic polymeric surfactant include POIZ 520, 521, 530, and 532A (available from Kao Corporation), which are special polycarboxylate type surfactants, from the perspective of obtaining a stable second slurry that does not cause sedimentation even when left standing.

KAOCER 2000, 2020, 2110 (available from Kao Corporation), or the like, which includes no metal ion such as sodium or potassium, may be used depending on the application.

The surfactant content of the second slurry is not particularly limited, and is preferably, for example, from 0.5 to 3.0 mass % relative to the total solid content of the second slurry.

When the surfactant content is too small, the dispersion of particles of halloysite and fine sand in the second slurry may be insufficient. On the other hand, when the surfactant content is too large, the surfactant may cause aggregation or costs may increase. In such a case, the surfactant may further cause problems in subsequent processes (for example, decrease in recovery rate of a dispersed phase in centrifugation, insufficient drying in spray-drying, or insufficient compaction or burning in firing).

<<Centrifugation>>

The obtained second slurry is subjected to centrifugation, thereby being separated into a sedimented phase of a lower layer and a dispersed phase of an upper layer. The sedimented phase includes a large amount of fine sand, and the dispersed phase includes a large amount of halloysite. The solid content concentration of the dispersed phase (slurry) is, for example, from 2 to 10 mass %.

The centrifugal force and treatment time for centrifugation are respectively from 2000 to 3000 G and from 3 to 30 minutes, for example, but are not limited to these numerical ranges. They are appropriately determined taking into account a dispersion state, application, costs, and the like.

A large-size centrifugal separator may be used for mass production.

After centrifugation, a dispersed phase can be recovered by suction using a pump or the like. A skimming nozzle may be used for recovering the dispersed phase. Halloysite may be thus purified and separated from Iide clay including halloysite and fine sand. The fact that the recovered dispersed phase includes a halloysite nanotube can be confirmed by, for example, a transmission electron microscope (TEM) image (see, FIGS. 1 and 2).

OTHER EMBODIMENTS

The slurry preparation step is not limited to the embodiments described above. For example, in a case where a raw material other than Iide clay is used, the solid content concentration of the second slurry, the surfactant content of the second slurry, the centrifugation condition, and the like may be modified accordingly.

Reduction of processes (for example, omission of preparation of the first slurry, sieving, and/or filtering), addition of a process, or the like may be modified appropriately.

For example, halloysite (halloysite nanotube), commercially available from Sigma-Aldrich Co. LLC., may be dispersed in water using a known apparatus and used as a slurry prepared in this step. Commercially available halloysite nanotubes may be subjected to dry purification, classification, magnetic separation, color sorting, or the like as necessary and used.

The slurry prepared in the slurry preparation step may be subjected to wet purification, classification, magnetic separation, or the like as necessary and used.

<Powder Preparation Step>

The powder preparation step is a step of preparing powder from the slurry prepared in the slurry preparation step.

The powder obtained in the powder preparation step may be granulated by further performing treatments such as tumbling, stirring, and extruding. Thus, granules constituting the powder can be increased in size.

<<Spray-Drying>>

Examples of the powder preparation step include a step of spray-drying the slurry prepared in the slurry preparation step (for example, the foregoing dispersed phase obtained by centrifugation) to obtain powder.

In spray-drying the prepared slurry, a spray-dryer is used. The spray-dryer is an apparatus that instantly produces powder by spraying a liquid raw material in the form of minute droplets (i.e., forming the material into fine particles) and drying the droplets through application of hot air. The spray-dryer is a known apparatus, and examples thereof include spray-dryers available from Ohkawara Kakohki Co., LTD., Fujisaki Electric Co., LTD., Japan Chemical Engineering & Machinery Co., Ltd., and Yamato Scientific Co., Ltd.

In the spray-dryer, the size of the powder particles (granules) obtained by drying can be controlled by changing the size of the droplets obtained by spraying the liquid raw material (i.e., forming fine particles).

The method of forming the liquid raw material into fine particles by using a spray-dryer is not particularly limited. For example, a known method such as a two-fluid nozzle method, a pressure nozzle (compression nozzle) method, a four-fluid nozzle method (twin-jet nozzle method), or a rotating disc method can be appropriately selected according to the size of droplets desired. The size of the powder particles (granules) obtained by drying depends on, for example, the concentration of the slurry and/or the amount of the slurry to be treated. Thus, in addition to selecting an appropriate method for forming fine particles, the state of the slurry is appropriately selected to achieve a desired particle size.

For the method of bringing hot air into contact with sprayed droplets, a typically-employed concurrent flow method in which both of hot air and sprayed droplets are directed downward; a countercurrent flow method in which sprayed droplets are directed downward and the hot air is directed upward, that is, the flows of the hot air and sprayed droplets are countercurrents; a mixed flow method in which sprayed droplets are directed upward and hot air is directed downward; and the like are appropriately selected.

In spray-drying, heat is instantaneously applied, and therefore the powder itself does not reach a high temperature. In spray-drying, the powder is directly obtained by drying the slurry, and therefore treatments such as filtering, drying, and pulverizing are eliminated, preventing contamination that may occur during a series of the operations.

<<Media Fluidized Drying>>

The method of preparing powder from the slurry is not limited to the spray-drying described above, and, for example, media fluidized drying (drying using a fluidized bed including balls) may be employed.

The powder preparation step may be a step of media-fluidized-drying the slurry prepared in the slurry preparation step to obtain powder.

In summary, the media fluidized drying involves, for example, continuously supplying a slurry to be dried into a layer of ceramic balls (φ 1 to 3 mm) in a fluidized state, and thus adhering the slurry on the surfaces of the balls. Objects to be dried are instantly dried by heat conduction from the heated balls and convective heat transfer from fluidization hot air, and then peeled off from the surfaces of the balls by collision among the balls. The powder is thus obtained.

<Firing Step>

The production method according to aspects of the present invention includes a step of firing the powder obtained in the powder preparation step at a firing temperature of not lower than 500° C. (firing step). Through firing at such the firing temperature, halloysite constituting granules becomes metahalloysite. In addition, owing to the firing at such the firing temperature, the granular structure before firing is maintained.

Moreover, by undergoing the firing step, the granules have a breaking strength of at least a predetermined value and have excellent water resistance. This is presumably because primary particles of metahalloysite constituting the granules strongly bond together through the firing step. It should be noted that the foregoing mechanism is merely a presumption and even if any mechanism other than the foregoing mechanism works, such a mechanism is to be within the scope according to aspects of the invention.

In a case where a surfactant is used for the preparation of the second slurry described above, the surfactant may also remain in the powder obtained by spray-drying or the like. Such a surfactant can be removed by performing firing in an air atmosphere.

The firing temperature is preferably not lower than 500° C. and not higher than 1,000° C., more preferably not lower than 500° C. and not higher than 900° C., even more preferably not lower than 500° C. and not higher than 900° C., particularly preferably not lower than 500° C. and not higher than 850° C., and most preferably not lower than 500° C. and not higher than 800° C.

The firing time is not particularly limited and is, for instance, from 0.5 to 2 hours, preferably from 0.75 to 1.5 hours.

The firing atmosphere is not particularly limited and is, for instance, an air atmosphere or a nitrogen atmosphere and preferably an air atmosphere.

The preferred embodiment of the production method according to aspects of the present invention has been described above.

The production method according to aspects of the present invention is not limited to the foregoing preferred embodiments as long as metahalloysite powder according to aspects of the present invention described later can be obtained and may be, for instance, a method including a slurry preparation step of preparing a slurry of metahalloysite including a metahalloysite nanotube and a powder preparation step of preparing powder (metahalloysite powder according to aspects of the present invention) from the slurry. In this case, the details of each step follow the description of each of the steps in the preferred embodiment described above.

[Metahalloysite Powder]

Next, the metahalloysite powder according to aspects of the present invention obtained by the production method according to aspects of the present invention will be described.

The metahalloysite powder according to aspects of the present invention (hereafter, also simply referred to as "powder according to aspects of the present invention") is powder including a granule that is an aggregate of metahalloysite including a metahalloysite nanotube that is a tube-shaped metahalloysite.

In the present specification, an aggregate of a plurality of "granules" is referred to as "powder."

Compared to the powder not including such a granule (mere metahalloysite powder, for instance), the powder according to aspects of the present invention exhibits effects including: easy automation and quantification in transportation, delivery, packaging and the like, owing to the good fluidity; size reduction for transportation, storage, packaging and the like, owing to the high bulk density; suppression of dust generation, i.e., scattering of fine powder to contaminate the surrounding environment, thereby reducing particularly concerns of nanosized particles for safety to human bodies; suppression of uneven distribution, i.e., segregation of the powder in a container caused by a difference in shape, size or the like of the particles, and reduction in deposition of the powder to a container, a machine wall, a packaging material and the like; and, when used as a catalyst or absorbent to contact with a gas or a liquid, reduction of the fluid resistance and promotion of easy separation/recovery or drying/reuse of the powder.

The granule of the powder according to aspects of the present invention exhibits the foregoing effects without inhibiting the functions of the metahalloysite nanotube that is also the primary particle constituting the granule.

In addition, the granule of the powder according to aspects of the present invention preferably includes a first pore derived from a tube hole of the metahalloysite nanotube, and a second pore different from the first pore.

<XRD>

Figure 17:
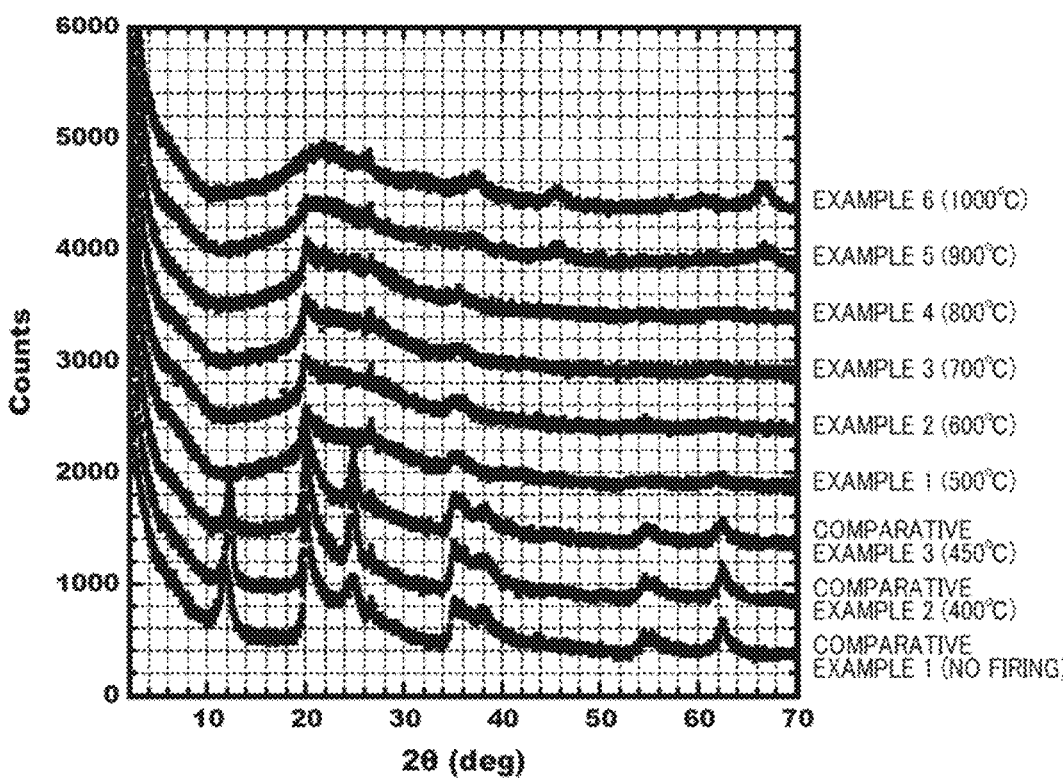
FIG. 17 is a graph showing the XRD patterns of powders of Examples 1 to 6 and Comparative Examples 1 to 3.

FIG. 17 is a graph showing the XRD patterns of the powders of Examples 1 to 6 and Comparative Examples 1 to 3 to be described later.

As is apparent from FIG. 17, peaks representing halloysite are observed in the XRD patterns of Comparative Example 1 (no firing), Comparative Example 2 (firing temperature: 400° C.) and Comparative Example 3 (firing temperature: 450° C.).

On the contrary, as is apparent from FIG. 17, peaks representing halloysite disappear in the XRD patterns of Example 1 (firing temperature: 500° C.) to Example 6 (firing temperature: 1,000° C.), while broad peaks can be seen around 2θ=20°. Such the XRD pattern indicates the presence of metahalloysite.

Meanwhile, as is apparent from FIG. 17, peaks representing γ-$Al_2O_3$ can be also seen in the XRD patterns of Example 5 (firing temperature: 900° C.) and Example 6 (firing temperature: 1,000° C.).

The specific conditions in the XRD measurement are as follows.
Instrument used: X-ray diffractometer, D8ADVANCE (available from BRUKER CORPORATION)
X-ray tube: CuKα
Optical system: Bragg-Brentano geometry
Tube voltage: 35 kV
Tube current: 40 mA
Detector: One-dimensional semiconductor detector
Scan range: 2 to 70 deg
Scan step: 0.021 deg
Scan speed: 4 deg/min

<SEM>

The fact that the granule included in the powder according to aspects of the present invention (hereinafter, also referred to as "the granule according to aspects of the present invention" for convenience) is a granule constituted of an aggregate of metahalloysite including a metahalloysite nanotube, and includes a pore derived from the tube hole of the metahalloysite nanotube (first pore) can be confirmed with the Scanning Electron Microscope (SEM) images, for example.

Figure 3:
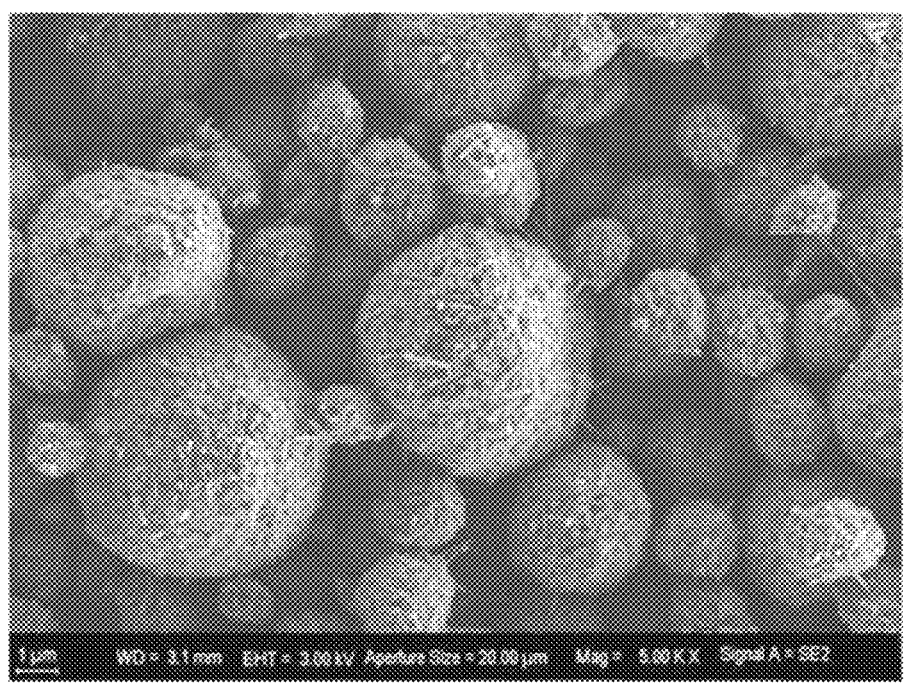
FIG. 3 is an SEM image showing powder of Example 7.
Figure 4:
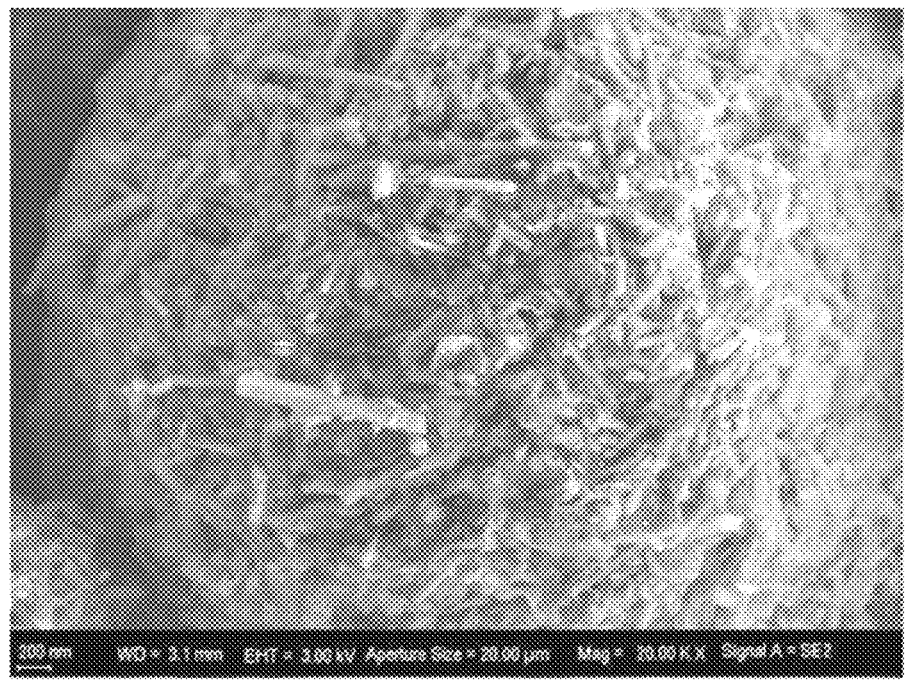
FIG. 4 is an SEM image showing the powder of Example 7 and is an enlarged image of FIG. 3.
Figure 5:
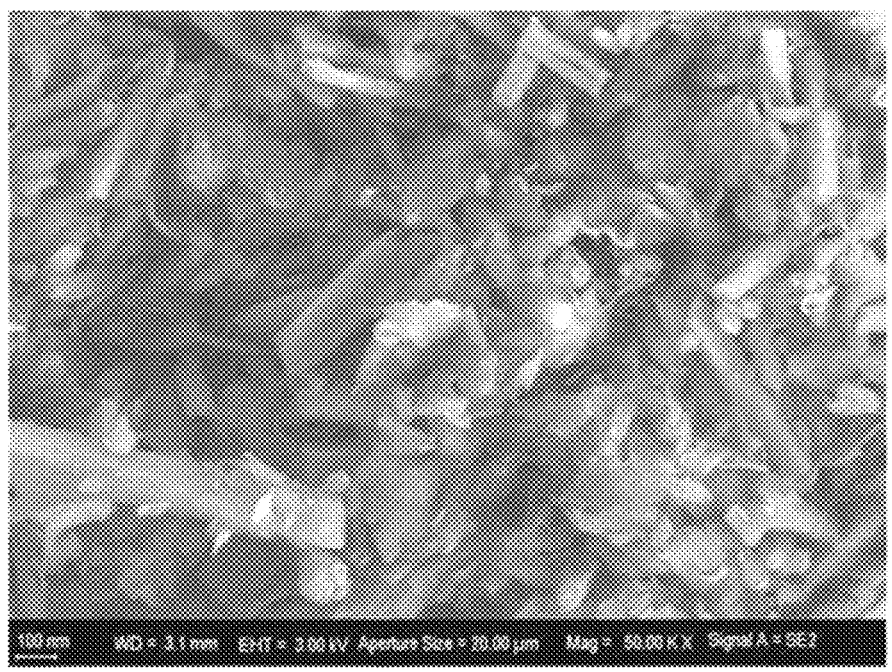
FIG. 5 is an SEM image showing the powder of Example 7 and is an enlarged image of FIG. 4.

FIGS. 3 to 5 are SEM images showing the powder of Example 7 described later (metahalloysite powder prepared by spray-drying followed by firing at 500° C.). FIG. 4 is an enlarged image of FIG. 3, and FIG. 5 is an enlarged image of FIG. 4.

In FIGS. 3 and 4, spherical granules are observed. In FIGS. 4 and 5, the fact that the granules are each an aggregate of metahalloysite including a metahalloysite nanotube can be confirmed.

Further, in FIGS. 4 and 5 (especially, FIG. 5), the tube holes of the metahalloysite nanotubes (first pores derived from the tube holes of the metahalloysite nanotubes) can be observed on the surface of the granule.

The reason why the granular structure including the first pore as above is obtained is probably because, for example, spray-drying a slurry including halloysite nanotubes allows the halloysite nanotubes to aggregate with their tube shape maintained. The resultant is then fired such that halloysite including the halloysite nanotube becomes metahalloysite.

In addition, in FIGS. 4 and 5, pores (second pores) with a larger size than that of the tube hole of the metahalloysite nanotube (normally, the inner diameter is approximately from 10 to 20 nm) can be observed on the surface of the granule.

The fact that the granule according to aspects of the present invention further includes the second pore different from the first pore can be confirmed, for example, in SEM images of the cross section of the granule (not shown). The cross section of the granule is exposed by, for example, processing the granules with Focused Ion Beams (FIB).

The reason why the second pore as above is obtained is probably because the dispersion medium of a slurry is evaporated and removed from the granule (inside of the granule) when the slurry is formed into granules by spray-drying or the like.

Figure 6:
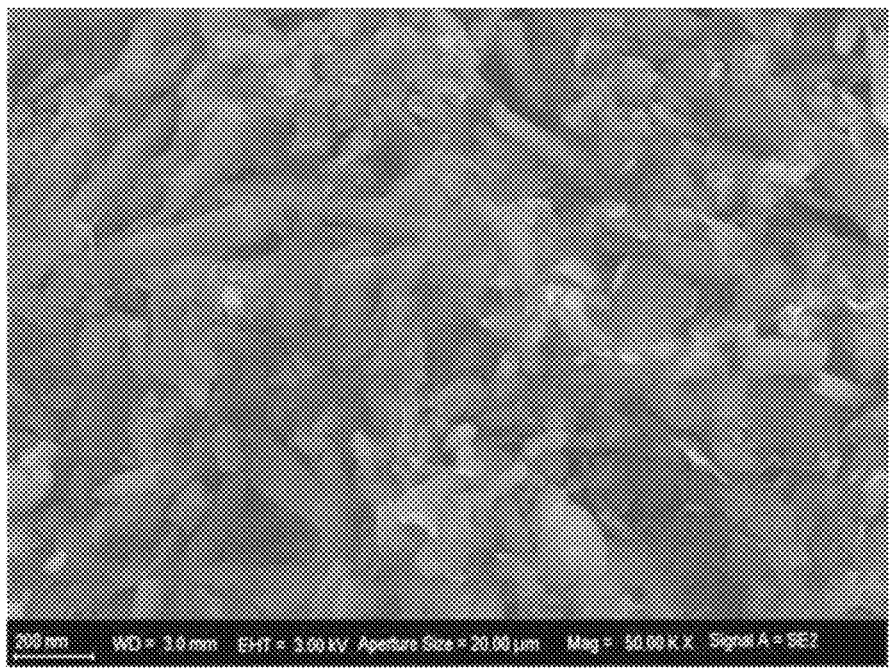
FIG. 6 is an SEM image showing powder of Comparative Example 4.

FIG. 6 is an SEM image showing the powder of Comparative Example 4 described later (halloysite powder prepared by spray-drying but not followed by firing) at the same magnification as that of FIG. 5.

As with FIG. 5, in FIG. 6, the first pore derived from the tube hole and the second pore with a larger size than that of the tube hole can be observed on the surface of the granule.

Accordingly, comparison of FIG. 5 with FIG. 6 reveals that the granule structure before the firing (FIG. 6) is not lost but is maintained after the firing at 500° C. (FIG. 5).

FIGS. 7, 8, 9 and 10 are SEM images showing the powders of Example 8 described later (firing temperature: 600° C.), Example 9 described later (firing temperature: 700° C.), Example 10 described later (firing temperature: 800° C.) and Example 11 described later (firing temperature: 900° C.), respectively, at the same magnification as that of FIG. 5.

As with FIG. 5, in FIGS. 7 to 10, the first pore derived from the tube hole and the second pore with a larger size than that of the tube hole can be observed on the surface of the granule.

Accordingly, it is revealed that the granule structure before the firing (FIG. 6) is maintained after the firing at 600° C. to 900° C. (FIGS. 7 to 10).

<Pore Distribution Measurement>

The fact that the granule included in the powder according to aspects of the present invention has the specific structure as described above can be confirmed also from the results obtained by measuring the pore distribution of the powder according to aspects of the present invention.

It is more preferable for the powder according to aspects of the present invention that the differential pore distribution (log differential pore volume distribution) determined from a nitrogen adsorption isotherm by the BJH method exhibit two or more pore size peaks.

In this regard, the two or more pore size peaks preferably appear in the range from 10 to 100 nm, more preferably from 10 to 70 nm, yet more preferably from 10 to 50 nm, and particularly preferably from 10 to 40 nm.

The details thereof will be described below.

Figure 11:
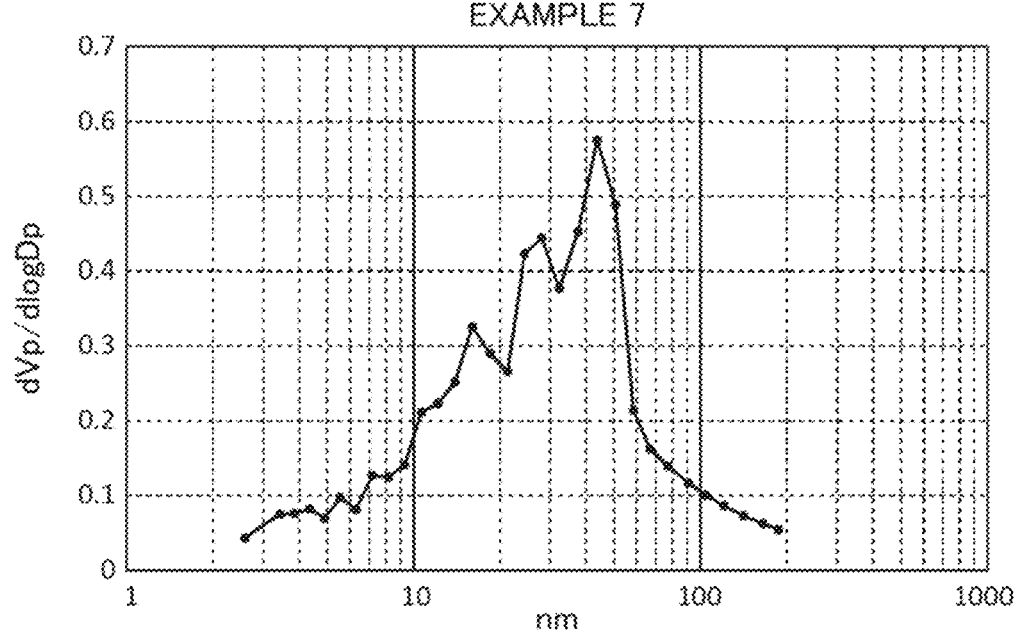
FIG. 11 is a graph showing the differential pore distribution of the powder of Example 7.

FIG. 11 is a graph showing the differential pore distribution (log differential pore volume distribution) determined from a nitrogen adsorption isotherm by the BJH method for the powder of Example 7 described later (metahalloysite powder prepared by spray-drying followed by firing at 500° C.). The horizontal axis represents pore size (nm), and the vertical axis represents differential pore volume (dVp/dlogDp) ($cm^3/g$) (the same applies hereinafter).

In the graph of FIG. 11 (Example 7), three pore size peaks clearly appear in the range from 10 to 100 nm. The pore size peak in the range from 10 nm to 20 nm represents the first pore derived from the tube hole of the metahalloysite nanotube (inner diameter: approximately from 10 to 20 nm), and the two pore size peaks in the range greater than 20 nm are regarded as both representing the second pore different from the tube hole.

It is understood that, in the powder (metahalloysite powder) of Example 7, the second pores are formed in the granule, and the pore sizes thereof are roughly classified into two types. It is presumed that the viscosity of the slurry used in the preparation of the powder, the dispersibility of the particles, and the like affect the second pore.

The pore size peak corresponding to the first pore preferably appears in the range from 10 nm to 20 nm. The pore size peak corresponding to the second pore preferably appears in the range of greater than 20 nm and not greater than 100 nm, more preferably greater than 20 nm and not greater than 70 nm, yet more preferably greater than 20 nm and not greater than 50 nm, and particularly preferably greater than 20 nm and not greater than 40 nm.

Figure 12:
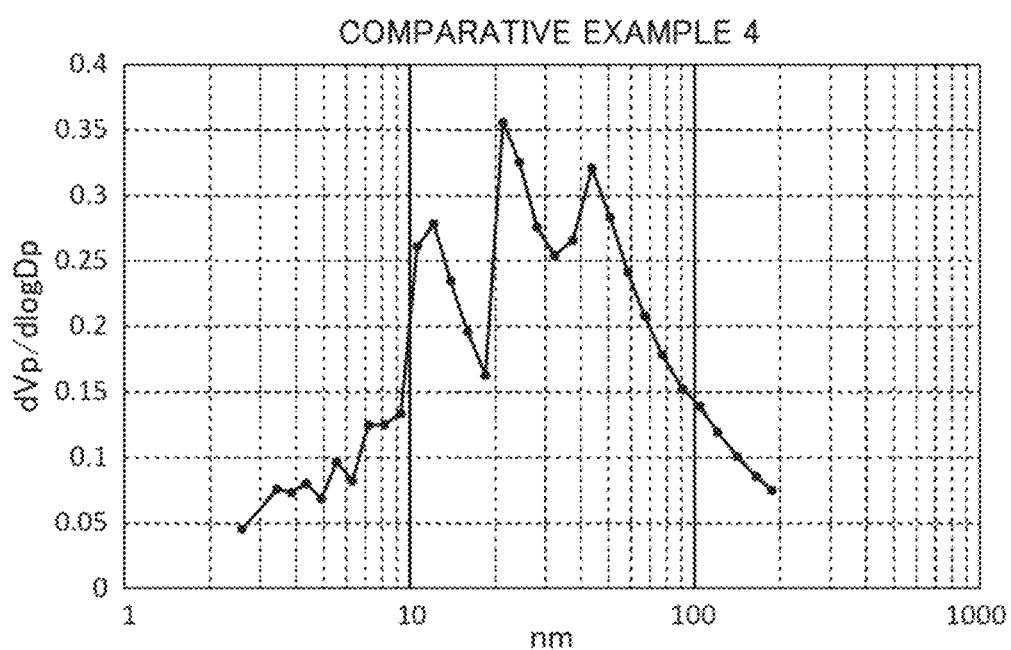
FIG. 12 is a graph showing the differential pore distribution of the powder of Comparative Example 4.
Figure 13:
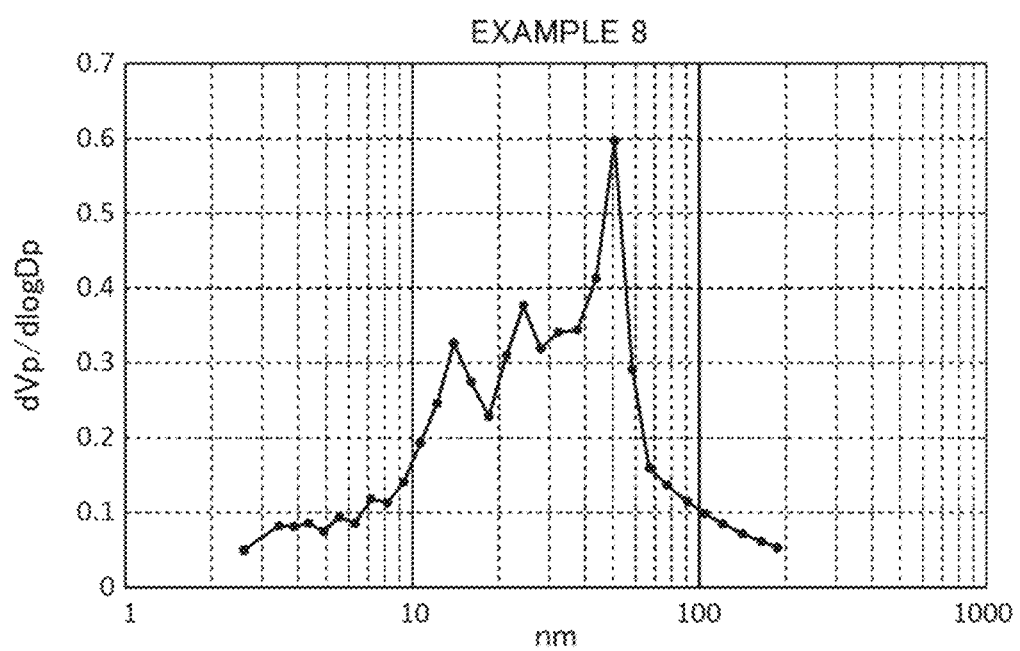
FIG. 13 is a graph showing the differential pore distribution of the powder of Example 8.
Figure 14:
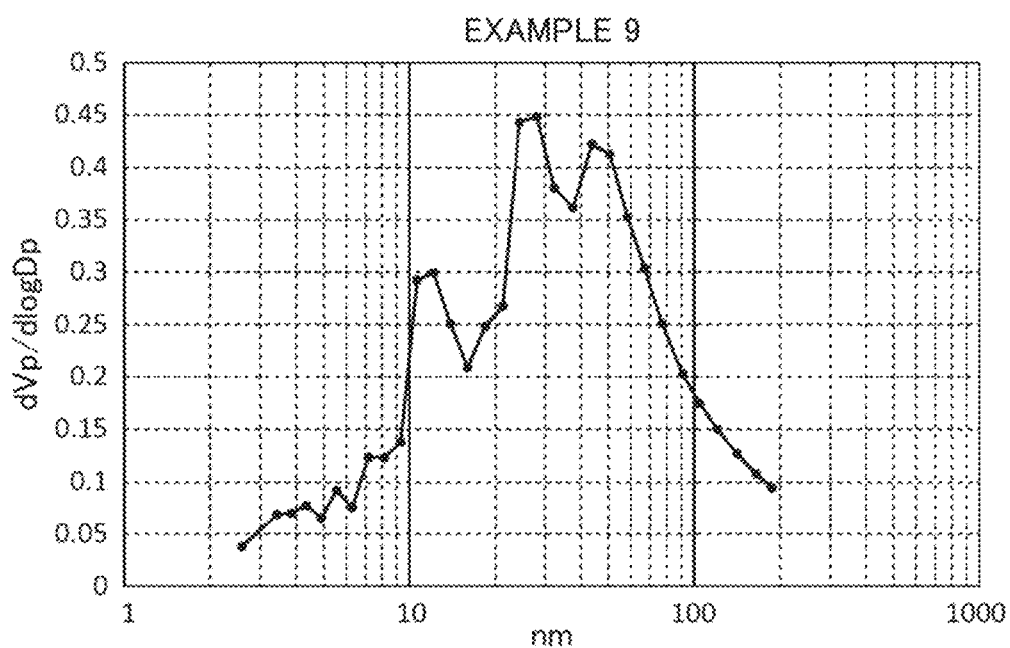
FIG. 14 is a graph showing the differential pore distribution of the powder of Example 9.
Figure 15:
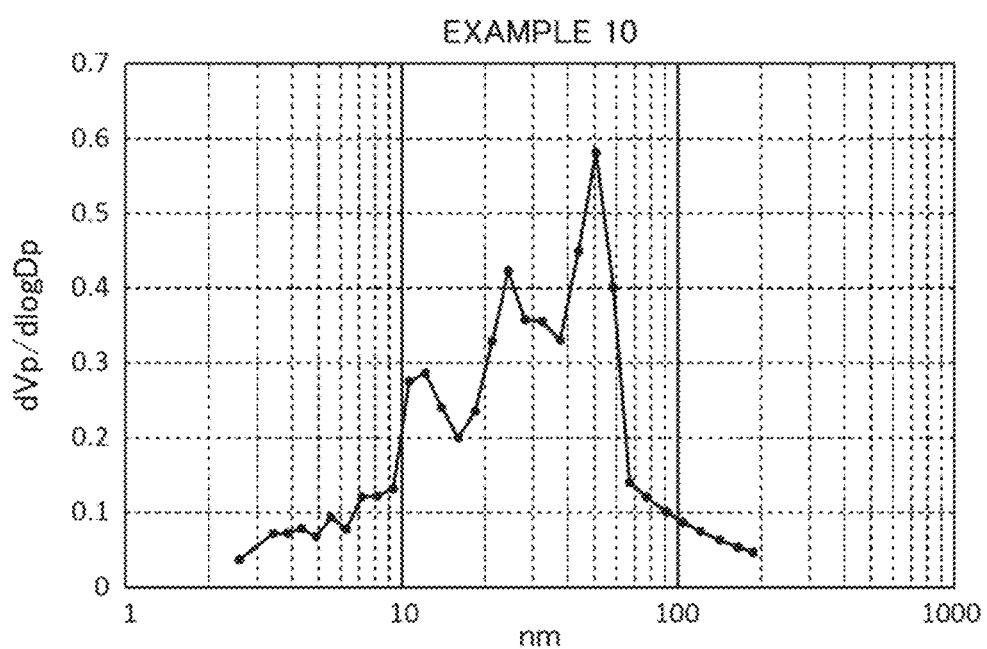
FIG. 15 is a graph showing the differential pore distribution of the powder of Example 10.
Figure 16:
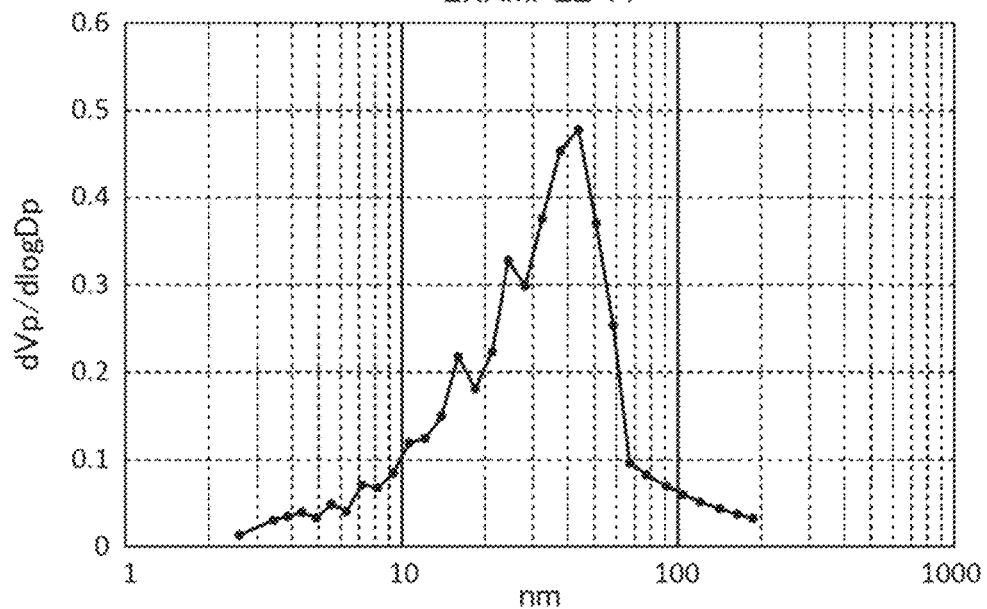
FIG. 16 is a graph showing the differential pore distribution of the powder of Example 11.

FIG. 12 is a graph showing the differential pore distribution of the powder of Comparative Example 4 described later (halloysite powder prepared by spray-drying but not followed by firing). FIG. 12 shows similar pore size peaks to those in FIG. 11. Accordingly, it is revealed that the granule structure before the firing (FIG. 12) is not lost but is maintained after the firing at 500° C. (FIG. 11).

FIGS. 13, 14, 15 and 16 are graphs showing the differential pore distributions of the powders of Example 8 described later (firing temperature: 600° C.), Example 9 described later (firing temperature: 700° C.), Example 10 described later (firing temperature: 800° C.) and Example 11 described later (firing temperature: 900° C.), respectively.

As with FIG. 11, in FIGS. 13 to 16, two or more pore size peaks clearly appear in the range from 10 nm to 100 nm. It is understood that the pore size peak in the range from 10 nm to 20 nm represents the first pore, and the pore size peak in the range greater than 20 nm represents the second pore, indicating that the granule structure is maintained.

When including the second pore, the powder according to aspects of the present invention has a large total pore area and a large total pore volume described later.

Specifically, the total pore area of the powder according to aspects of the present invention is, for example, not less than 12.0 m$^2$/g, preferably not less than 50.0 m$^2$/g, more preferably not less than 59.0 m$^2$/g, yet more preferably not less than 65.0 m$^2$/g, and particularly preferably not less than 75.0 m$^2$/g. The upper limit of the total pore area is not particularly limited, and, for example, is not greater than 200.0 m$^2$/g, and preferably not greater than 150.0 m$^2$/g.

The total pore volume of the powder according to aspects of the present invention is, for example, not less than 0.10 cm$^3$/g, preferably not less than 0.20 cm$^3$/g, and more preferably not less than 0.23 cm$^3$/g. The upper limit of the total pore volume is not particularly limited, and, for example, is not greater than 0.80 cm$^3$/g, and preferably not greater than 0.60 cm$^3$/g.

In addition, the average pore size of the powder according to aspects of the present invention is, for example, not less than 5.0 nm and preferably not less than 11.0 nm. The upper limit of the average pore size is not particularly limited, and, for example, is not greater than 30.0 nm, and preferably not greater than 25.0 nm.

The BET specific surface area (specific surface area determined by the BET method) of the powder according to aspects of the present invention is, for example, not less than 10 m$^2$/g, preferably not less than 30 m$^2$/g, and more preferably not less than 50 m$^2$/g. The upper limit of the BET specific surface area is not particularly limited and is, for instance, not greater than 200 m$^2$/g and preferably not greater than 150 m$^2$/g.

Next, the method of measuring the pore distribution and the like will be described.

A pretreatment (vacuum-deaeration at 120° C. for 8 hours) is first performed on powder, and then a nitrogen adsorption-desorption isotherm is measured by a constant volume method under the following conditions. The equilibrium waiting time refers to the waiting time after reaching an adsorption equilibrium state.

The BET specific surface area (m$^2$/g) is determined by applying the BET method using the nitrogen adsorption isotherm.

The average pore size (nm) is calculated from the values of the BET specific surface area and the total pore volume (cm$^3$/g). The total pore volume used for calculation of the average pore size (for convenience, also referred to as "total pore volume for calculation") is determined from the adsorption amount at a relative pressure of 0.99 on the adsorption isotherm, assuming that capillary condensation occurs in pores that are present at relative pressures up to 0.99 on the adsorption isotherm.

Furthermore, the log differential pore volume distribution, the total pore volume (cm$^3$/g), and the total pore area (m$^2$/g) are determined by applying the BJH method using the FHH reference curve from the nitrogen adsorption isotherm. The standard conditions of analysis software are used for the plot intervals of the pores of approximately from 2.6 nm to 200 nm in size. Note that the total pore volume and the total pore area determined by the BJH method are respectively referred to as "BJH total pore volume" and "BJH total pore area."

In accordance with aspects of the present invention, in the case of simply referring to "total pore volume" and "total pore area", the "total pore volume" and the "total pore area" respectively mean the "BJH total pore volume" and the "BJH total pore area" unless noted otherwise.

Adsorption temperature: 77 K
    Nitrogen cross-sectional area: 0.162 nm$^2$
    Saturated vapor pressure: Measured
    Equilibrium waiting time: 500 sec
    Pretreatment instrument: BELPREP-vacII (available from MicrotracBEL Corp.)
    Measurement instrument: BELSORP-mini (available from MicrotracBEL Corp.)
    Analysis software: BELMaster Version 6.4.0.0 (available from MicrotracBEL Corp.)

<Average Particle Size>

The average particle size of the powder according to aspects of the present invention is not particularly limited, and appropriately selected depending on the application. The average particle size is, for example, from 0.5 to 200 μm. In a case where the powder according to aspects of the present invention is prepared by spray-drying, the average particle size is preferably from 1 to 100 μm.

The granules having such particle sizes may be increased in size through the granulation described above. Note that, in this case, the average particle size is preferably not greater than 5 mm.

Taking into account the size with which the granules can enter organs of respiration as a concern of harm, the granules preferably have the minimum size of not less than 1 μm.

The average particle size is dry-measured by using a laser diffraction-scattering type particle size distribution measuring apparatus (Microtrac MT3300EXII) available from MicrotracBEL Corp.

<Breaking Strength>

The powder according to aspects of the present invention preferably has the breaking strength of not lower than 7.6 MPa of the granules that are immersed in pure water for 24 hours. With this breaking strength, the powder according to aspects of the present invention has excellent water resistance.

The breaking strength is more preferably not lower than 8.0 MPa, and even more preferably not lower than 8.3 MPa because the water resistance is further excellent.

Meanwhile, the upper limit of the breaking strength is not particularly limited.

The breaking strength of the granules is measured by a compression test using a microcompression tester and is determined as an average value of five test results.

More specifically, the powder (granules) having been immersed in pure water (deionized water) for 24 hours to contain water is used as a specimen. An infinitesimal amount of the specimen is dispersed on the specimen holder (lower press plate) of a microcompression tester MCT-510 (manufactured by Shimadzu Corporation), and each particle of the specimen is subjected to a compression test to find the breaking strength. An average value of five test results (breaking strengths) is determined as the breaking strength of the powder.

In the compression test, each specimen is measured on the specimen holder for the diameters in the X direction and the Y direction, and the average value of the measurements is determined as the particle size of the specimen.

<Application of Metahalloysite Powder>

The metahalloysite powder according to aspects of the present invention can be developed for a wide variety of applications.

Examples of the applications include cosmetics, coloring materials, nanoparticles for precision polishing, nanomagnetic materials, catalysts, catalyst supports, humidity-controlling materials, deodorants, deodorizers, adsorbents, sustained-release agents, anti-bacterial agents, pharmaceuticals, and artificial enzymes. The applications are not limited thereto.

For example, the metahalloysite powder according to aspects of the present invention has the first pores derived from the tube holes so as to exhibit excellent humidity-control property as compared to powders having no first pores derived from tube holes.

The metahalloysite powder according to aspects of the present invention is also suitable for fillers, coating materials, and the like, which impart characteristics such as weight reduction, thermal insulation, sound absorbing, and environmental cleaning.

In addition, the metahalloysite powder according to aspects of the present invention is not only used alone for the foregoing applications but can be also applied as a hybrid body in which one or more kinds of ion, molecule, polymer, nanoparticle and the like with a size of not greater than 100 nm is included in the powder for the improved functionality. For instance, when used as a hybrid body in which an effective ingredient such as a drug is included, it can be expected that the effective ingredient evenly acts, thereby prolonging the efficacy of the effective ingredient.

When the metahalloysite powder according to aspects of the present invention includes the second pores and when the second pores have a pore size close to the size of a bacteria or a virus, the powder can be used for trapping the bacteria or virus (hereinafter, called "virus and the like").

Specifically, for example, when the metahalloysite powder according to aspects of the present invention has excellent water resistance, the powder is suitable for a water purifying filter for trapping a virus and the like in water.

The metahalloysite powder according to aspects of the present invention after trapping the virus and the like may be subjected to heat treatment such that the trapped virus and the like are removed and may be reused later.

Other than these applications, in a case where the water resistance is excellent, even when contacting water in a process of being formed into a final product, the metahalloysite powder according to aspects of the present invention maintains the granule structure and exhibits the functions thereof.

EXAMPLES

Aspects of the present invention are specifically described below with reference to examples. However, the present invention is not limited thereto.

<Preparation of Powder>

The powders of Examples 1 to 16 and Comparative Examples 1 to 7 were prepared as described below.

As described later, the powders of Examples 1 to 16 are metahalloysite powder, while the powders of Comparative Examples 1 to 7 are not metahalloysite powder.

<<Raw Material (Iide Clay)>>

Iide clay described above was used as a raw material. XRD measurement of Iide clay was performed, and peaks (not illustrated) that represent halloysite and fine sand (quartz) were observed.

Preparation of First Slurry>>

Iide clay and water were charged into a high-speed mixer (available from NISSEI Corporation, Ultra Homomixer UHM-20 (20 L)), and subjected to a treatment for 10 minutes at 8,000 rpm, and thereby a first slurry in which Iide clay was dispersed in water (solid content concentration: 10 mass %) was obtained.

<<Removal of Coarse Particles>>

All of the first slurry was passed through a sieve for JIS test with an aperture of 45 μm to remove coarse particles remaining on the 45 μm mesh (approximately 30%). At that time, to prevent clogging and facilitate recovery of particles having passed through the 45 μm mesh, operations of adding water on the sieve and brushing off the particles on the sieve with a brush were appropriately performed. Even in a case where a sieve with an aperture of 25 μm or 100 μm was used, the final quality was the same.

<<Filtering>>

Next, the first slurry including particles having passed through the 45 μm mesh was filtered with suction using a filter, and the resultant dehydrated cake was recovered.

Preparation of Second Slurry>>

The dehydrated cake and water were charged into a high-speed mixer (available from NISSEI Corporation, Ultra Homomixer UHM-20), and an anionic polymeric surfactant (available from Kao Corporation, POIZ 520) was added thereto. The mixture was subjected to a treatment for 10 minutes at 10,000 rpm, and thereby a second slurry in which Iide clay was dispersed in water (solid content concentration: 20 mass %) was obtained. The content of the anionic polymeric surfactant relative to the total solid content of the second slurry was 1.5 mass %.

<<Centrifugation>>

The second slurry was stirred, 80 mL per one tube was collected from the second slurry during stirring, and the collected slurry was placed in a centrifuge (available from Kokusan Corp., small-size desktop centrifugal machine H-19α, rotor: RF-109L, bucket: MF-109L, tube: 100 mL×4, made from PP, outer diameter: 45 mm, inner diameter: 40 mm, height: 100 mm).

Centrifugation was performed at a centrifugal force of 2470 G for 10 minutes to separate the slurry into a sedimented phase and a dispersed phase.

In the dispersed phase, the upper portion which was separated from the sedimented phase by not less than 5 mm was sucked with a pump and recovered as the dispersed phase. The solid content concentration of the recovered dispersed phase (slurry) is shown in Table 1 below.

Figure 2:
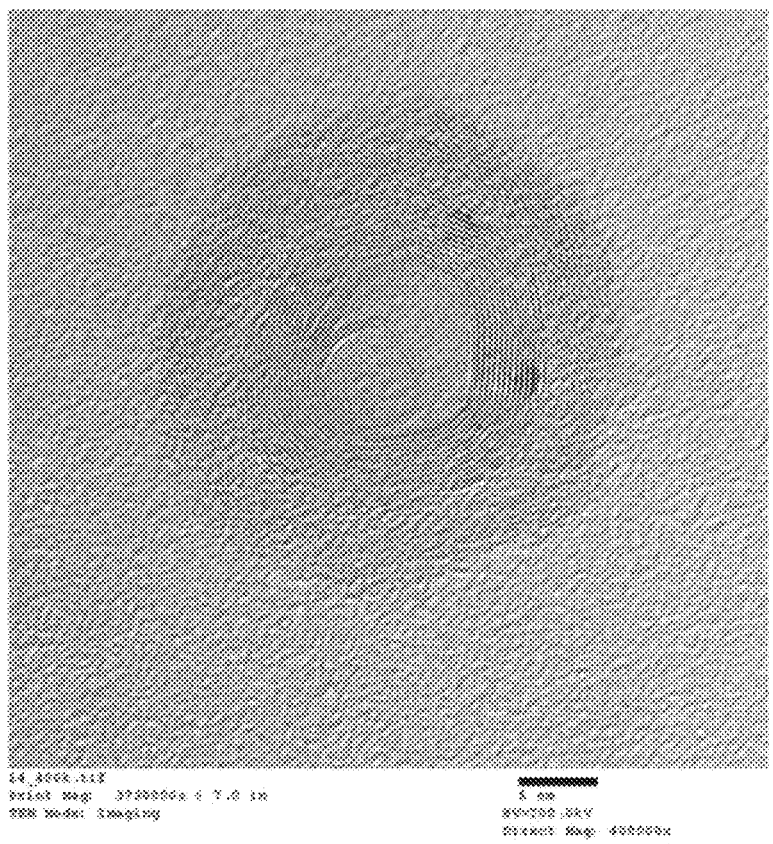
FIG. 2 is a TEM image of the dispersed phase recovered after centrifugation, taken in the field of view different from that of FIG. 1.

FIGS. 1 and 2 are TEM images of a dispersed phase recovered after centrifugation in Example 1. The fields of views of FIGS. 1 and 2 are different from each other. As shown in FIGS. 1 and 2, the presence of a halloysite nanotube was observed in the recovered dispersed phase. More specifically, a long halloysite nanotube can be seen in FIG. 1, and the side surface (cross section) of the halloysite nanotube can be seen in FIG. 2. Although not shown in the TEM images, halloysite with a shape other than a tubular shape (for example, a sheet-like shape) was also observed.

Spray-Drying

The recovered dispersed phase (slurry) was spray-dried by using a spray-dryer to obtain powder (halloysite powder).

The spray-dryer L-8i available from Ohkawara kakohki Co., LTD. was used as the spray-dryer. The slurry was dispensed to the spray-dryer with a pump at a constant volume, and formed into fine particles (sprayed). As the method of bringing hot air into contact with sprayed droplets, the concurrent flow method in which both of hot air and sprayed droplets are directed downward was used.

At this time, in each example, the average particle size of the powder to be obtained was adjusted by modifying the spray-drying conditions (the solid content concentration of the slurry, the fine particle formation method, the evaporation amount of moisture (kg/h), the inlet temperature (° C.), and the outlet temperature (° C.)) as shown in Table 1 below.

In a case where the rotating disc method was employed as the fine particle formation method, the rotational speed (rpm) of the rotating disc was modified for each example as shown in Table 1 below. In a case where the four-fluid nozzle method (twin-jet nozzle method) was employed as the fine particle formation method, the spray air pressure (MPa) was set as shown in Table 1 below.

<<Firing>>

The powder was fired after spray-drying, except in some examples.

Specifically, the powder after spray-drying was heated with an electric furnace utilizing Siliconit heating elements by increasing the temperature of the electric furnace from room temperature at a temperature increase rate of 5° C./min. and maintaining the temperature at the firing temperature shown in Table 1 above for 1 hour, and then the powder was cooled in the furnace. When the temperature was increased and maintained at the firing temperature, in order to promote burning off of the surfactant, ventilation was performed while a certain amount of air was supplied into the furnace.

Removal of the surfactant from the powder after firing was confirmed by TG-DTA (thermogravimetry-differential thermal analysis).

In a case where the firing was not performed, the space for firing temperature in Table 1 above was filled with <Evaluation of Powder>

The powders of Examples 1 to 16 and Comparative Examples 1 to 7 were evaluated as described below.

<<XRD>>

The XRD measurement of the powders of Examples 1 to 16 and Comparative Examples 1 to 7 was performed. The measurement conditions are as described above.

FIG. 17 is a graph showing the XRD patterns of the powders of Examples 1 to 6 and Comparative Examples 1 to 3.

As shown in FIG. 17, peaks representing halloysite ($Al_2Si_2O_5(OH)_4$) were observed in the XRD patterns of Comparative Example 1 (no firing), Comparative Example 2 (firing temperature: 400° C.) and Comparative Example 3 (firing temperature: 450° C.). In those cases, the spaces for "XRD" in Table 2 below were filled with "halloysite."

TABLE 1

| | | | Spray-drying | | | | | |
|---|---|---|---|---|---|---|---|---|
| | Fine particle formation method | Slurry solid content concentration [mass %] | Spray air pressure [MPa] | Disc rotational speed [rpm] | Moisture evaporation amount [kg/h] | Inlet temperature [° C.] | Outlet temperature [° C.] | Firing Firing temperature |
| CE 1 | Rotating | 6.7 | — | 17,000 | 1.95 | 170 | 88 | — |
| CE 2 | disc | 6.7 | — | 17,000 | 1.95 | 170 | 88 | 400 |
| CE 3 | method | 6.7 | — | 17,000 | 1.95 | 170 | 88 | 450 |
| EX 1 | | 6.7 | — | 17,000 | 1.95 | 170 | 88 | 500 |
| EX 2 | | 6.7 | — | 17,000 | 1.95 | 170 | 88 | 600 |
| EX 3 | | 6.7 | — | 17,000 | 1.95 | 170 | 88 | 700 |
| EX 4 | | 6.7 | — | 17,000 | 1.95 | 170 | 88 | 800 |
| EX 5 | | 6.7 | — | 17,000 | 1.95 | 170 | 88 | 900 |
| EX 6 | | 6.7 | — | 17,000 | 1.95 | 170 | 88 | 1000 |
| CE 4 | Four-fluid | 5.7 | 0.25 | — | 2.60 | 190 | 67 | — |
| CE 5 | nozzle | 5.7 | 0.25 | — | 2.60 | 190 | 67 | 450 |
| EX 7 | method | 5.7 | 0.25 | — | 2.60 | 190 | 67 | 500 |
| EX 8 | | 5.7 | 0.25 | — | 2.60 | 190 | 67 | 600 |
| EX 9 | | 5.7 | 0.25 | — | 2.60 | 190 | 67 | 700 |
| EX 10 | | 5.7 | 0.25 | — | 2.60 | 190 | 67 | 800 |
| EX 11 | | 5.7 | 0.25 | — | 2.60 | 190 | 67 | 900 |
| CE 6 | Rotating | 6.4 | — | 12,000 | 1.92 | 155 | 77 | — |
| CE 7 | disc | 6.4 | — | 12,000 | 1.92 | 155 | 77 | 450 |
| EX 12 | method | 6.4 | — | 12,000 | 1.92 | 155 | 77 | 500 |
| EX 13 | | 6.4 | — | 12,000 | 1.92 | 155 | 77 | 600 |
| EX 14 | | 6.4 | — | 12,000 | 1.92 | 155 | 77 | 700 |
| EX 15 | | 6.4 | — | 12,000 | 1.92 | 155 | 77 | 800 |
| EX 16 | | 6.4 | — | 12,000 | 1.92 | 155 | 77 | 900 |

CE: Comparative Example
EX: Example

On the other hand, as shown in FIG. 17, the peaks representing halloysite disappeared in the XRD patterns of Example 1 (firing temperature: 500° C.) to Example 6 (firing temperature: 1,000° C.). Meanwhile, broad peaks were seen around 2θ=20°. Such the XRD pattern indicates the presence of metahalloysite. In those cases, the spaces for "XRD" in Table 2 below were filled with "metahalloysite."

It should be noted that a peak around 2θ=26° is a peak representing quartz and indicates that a minute amount of quarts contained in the raw material is present.

As shown in FIG. 17, peaks representing γ-Al$_2$O$_3$ were observed in the XRD patterns of Example 5 (firing temperature: 900° C.) and Example 6 (firing temperature: 1,000° C.). In those cases, the spaces for "XRD" in Table 2 below were further filled with "γ-Al$_2$O$_3$."

As to the powders of the remaining Examples 7 to 16 and Comparative Examples 4 to 7, their XRD measurement results were similarly filled in the spaces for "XRD" in Table 2 below.

<<SEM>>

SEM images of the powders of Examples 1 to 16 and Comparative Examples 1 to 7 were taken.

FIGS. 3 to 5 are SEM images showing the powder of Example 7, FIG. 4 is an enlarged image of FIG. 3, and FIG. 5 is an enlarged image of FIG. 4.

Figure 7:
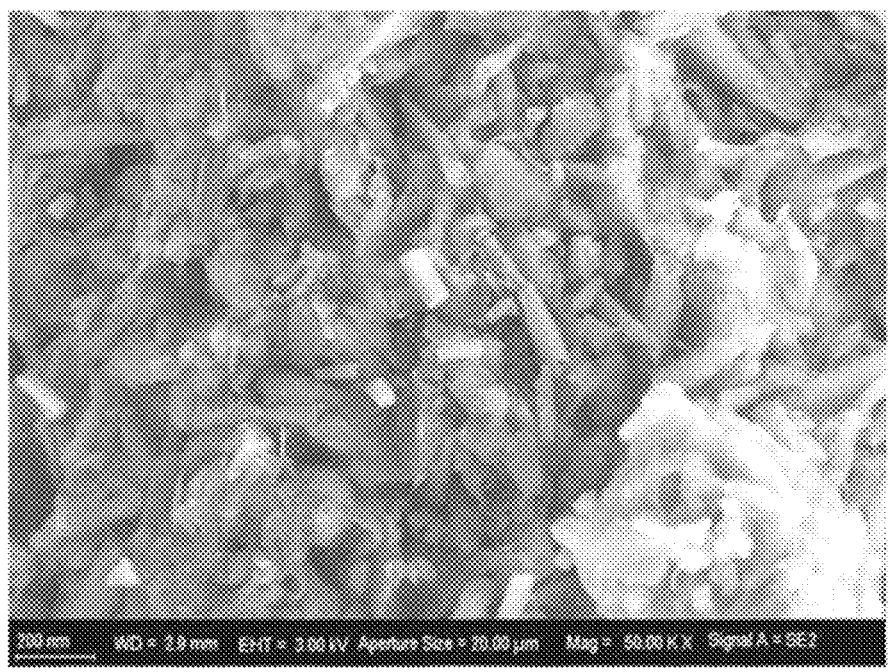
FIG. 7 is an SEM image showing powder of Example 8.
Figure 8:
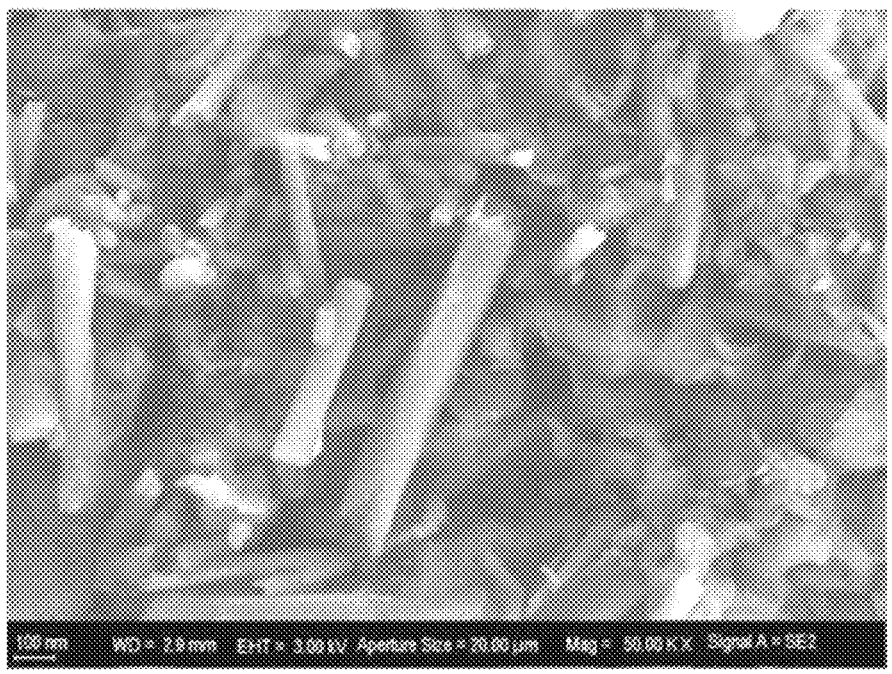
FIG. 8 is an SEM image showing powder of Example 9.
Figure 9:
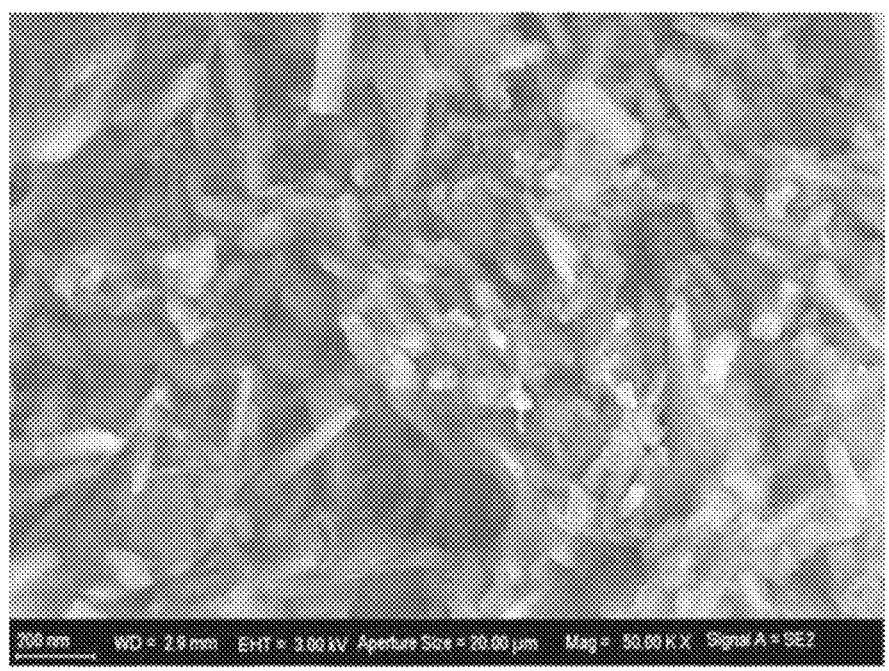
FIG. 9 is an SEM image showing powder of Example 10.
Figure 10:
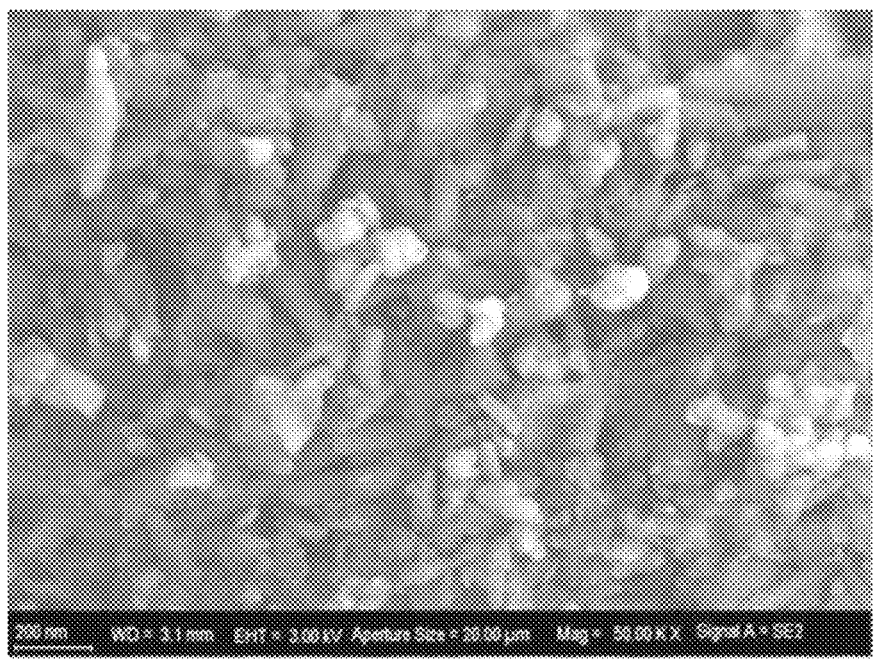
FIG. 10 is an SEM image showing powder of Example 11.

FIG. 6 is an SEM image showing the powder of Comparative Example 4. FIG. 7 is an SEM image showing the powder of Example 8. FIG. 8 is an SEM image showing the powder of Example 9. FIG. 9 is an SEM image showing the powder of Example 10. FIG. 10 is an SEM image showing the powder of Example 11. FIGS. 6 to 10 are SEM images of the same magnification as that of FIG. 5.

From the SEM images of FIGS. 3 to 5 and 7 to 10, it was confirmed that: the powders (metahalloysite powders) of Examples 7 to 11 each included a granule that was an aggregate of metahalloysite including metahalloysite nanotubes; pores derived from tube holes of metahalloysite nanotubes (first pores) were present in the granule; and pores having a larger diameter than that of the tube holes of metahalloysite nanotubes (second pores) were present in the granule.

This was also true in the SEM images of the metahalloysite powders of Examples 1 to 6 and 12 to 16 (not illustrated).

In addition, the same holds for the SEM image (FIG. 6) of Comparative Example 4.

Comparison of FIGS. 5 and 7 to 10 (Examples 7 to 11) with FIG. 6 (Comparative Example 4) reveals that the granule structure before firing (FIG. 6) is not lost but is maintained even after firing at 500° C. to 900° C. (FIGS. 5 and 7 to 10).

<<Pore Distribution Measurement>>

The nitrogen adsorption isotherms of the powders of Examples 1 to 16 and Comparative Examples 1 to 7 were obtained. The measurement conditions are as described above.

FIGS. 11 to 16 are graphs showing the differential pore distributions determined from the nitrogen adsorption isotherms by the BJH method for the powders of Example 7, Comparative Example 4, Example 8, Example 9, Example 10 and Example 11, respectively. In each graph, the horizontal axis represents pore size (nm), and the vertical axis represents differential pore volume (dVp/dlogDp) (cm$^3$/g).

In the graphs shown in FIGS. 11 and 13 to 16 (Examples 7 to 11), two or more pore size peaks were observed in the range from 10 to 100 nm.

This was also true in the graphs of the differential pore distributions of the powders of Examples 1 to 6 and 12 to 16 (not illustrated). In addition, the same holds for the graph of Comparative Example 4 (FIG. 12).

Comparison of FIGS. 11 and 13 to 16 with FIG. 12 reveals that the granule structure before firing (FIG. 12) is not lost but is maintained even after firing at 500° C. to 900° C. (FIGS. 11 and 13 to 16).

Along with the pore distribution measurement, the BJH total pore area, the BJH total pore volume, the BET specific surface area, the total pore volume for calculation, and the average pore size were determined for the powders of Examples 1 to 16 and Comparative Examples 1 to 7. The results are shown in Table 2 below.

<<Average Particle Size>>

The average particle sizes of the powders of Examples and Comparative Examples were measured. The results are shown in Table 2 below. For Examples 7 to 11 where the average particle size was not measured, the spaces for "Average particle size" in Table 2 below were filled with "–."

<<Compression Test (Water Contained)>>

The powders of Examples and Comparative Examples having been immersed in water for 24 hours to contain water were used as specimens. While the particle sizes of the specimens were measured, the compression tests were conducted to find the breaking strengths of the specimens. The details of the compression test are as described above. The average values of five test results are shown in Table 2 below. For Examples 3, 5, 6, 9, 11 and 13 to 16 where the compression test was not conducted, the spaces for "Compression test" in Table 2 below were filled with "–."

<<Water Resistance>>

Water resistance of the powders of Examples 1 to 16 and Comparative Examples 1 to 7 was evaluated.

Specifically, 2 g of each powder (specimen) and 8 g of pure water were put in a glass container with a lid and subjected to shaking five times. Thereafter, the content of the container was dispersed for 30 minutes using an ultrasonic cleaner and further dispersed for 110 minutes with ultrasonic waves.

After having been left to stand, the content of the container was observed. When the specimen and pure water were separated, "A" was filled in Table 2 below, whereas when the specimen and pure water were not separated but uniformly gelated, "B" was filled in Table 2 below. The powder with "A" can be evaluated as having excellent water resistance.

[Table 2]

TABLE 2

| | XRD | BJH total pore area [m$^2$/g] | BJH total pore volume [cm$^3$/g] | BET specific surface area [m$^2$/g] | Total pore volume for calculation [cm$^3$/g] | Average pore size [nm] | Average particle size [µm] | Compression test (water contained) Particle size [µm] | Compression test (water contained) Breaking strength [MPa] | Water resistance |
|---|---|---|---|---|---|---|---|---|---|---|
| CE 1 | Halloysite | 88.3 | 0.28 | 74.2 | 0.28 | 14.9 | 26.5 | 19.50 | 7.50 | B |
| CE 2 | Halloysite | 81.8 | 0.31 | 63.0 | 0.30 | 18.9 | 26.2 | 19.33 | 6.27 | B |
| CE 3 | Halloysite | 84.1 | 0.34 | 67.5 | 0.33 | 19.6 | 26.4 | 19.54 | 10.36 | A |
| EX 1 | Metahalloysite | 93.0 | 0.36 | 72.6 | 0.35 | 19.5 | 25.7 | 19.49 | 20.36 | A |
| EX 2 | Metahalloysite | 87.2 | 0.34 | 70.5 | 0.33 | 18.9 | 25.8 | 19.41 | 30.47 | A |

TABLE 2-continued

|  | XRD | BJH total pore area [m²/g] | BJH total pore volume [cm³/g] | BET specific surface area [m²/g] | Total pore volume for calculation [cm³/g] | Average pore size [nm] | Average particle size [μm] | Compression test (water contained) Particle size [μm] | Compression test (water contained) Breaking strength [MPa] | Water resistance |
|---|---|---|---|---|---|---|---|---|---|---|
| EX 3 | Metahalloysite | 89.5 | 0.34 | 71.1 | 0.33 | 18.8 | 25.3 | — | — | A |
| EX 4 | Metahalloysite | 89.0 | 0.34 | 68.3 | 0.33 | 19.5 | 25.3 | 19.56 | 42.94 | A |
| EX 5 | Metahalloysite, γ-Al₂O₃ | 53.6 | 0.28 | 40.1 | 0.27 | 27.3 | 24.0 | — | — | A |
| EX 6 | Metahalloysite, γ-Al₂O₃ | 15.3 | 0.12 | 13.4 | 0.12 | 35.7 | 22.1 | — | — | A |
| CE 4 | Halloysite | 89.0 | 0.34 | 80.3 | 0.33 | 16.5 | 4.2 | 4.98 | 6.80 | B |
| CE 5 | Halloysite | 94.5 | 0.38 | 77.5 | 0.37 | 19.2 | 4.1 | 4.89 | 9.81 | A |
| EX 7 | Metahalloysite | 96.1 | 0.39 | 81.4 | 0.38 | 18.7 | — | 4.96 | 18.12 | A |
| EX 8 | Metahalloysite | 96.1 | 0.37 | 82.6 | 0.36 | 17.5 | — | 4.86 | 25.16 | A |
| EX 9 | Metahalloysite | 94.0 | 0.41 | 76.5 | 0.40 | 21.1 | — | — | — | A |
| EX 10 | Metahalloysite | 91.4 | 0.37 | 73.0 | 0.36 | 19.8 | — | 4.89 | 35.51 | A |
| EX 11 | Metahalloysite, γ-Al₂O₃ | 55.8 | 0.28 | 41.4 | 0.27 | 26.3 | — | — | — | A |
| CE 6 | Halloysite | 92.0 | 0.28 | 80.8 | 0.27 | 13.6 | 31.5 | 39.56 | 5.86 | B |
| CE 7 | Halloysite | 95.9 | 0.32 | 80.3 | 0.31 | 15.6 | 31.8 | 39.52 | 8.54 | A |
| EX 12 | Metahalloysite | 101.1 | 0.35 | 84.4 | 0.34 | 16.1 | 31.8 | 39.55 | 17.46 | A |
| EX 13 | Metahalloysite | 97.3 | 0.33 | 82.5 | 0.32 | 15.7 | 31.9 | — | — | A |
| EX 14 | Metahalloysite | 94.8 | 0.33 | 79.1 | 0.32 | 16.0 | 31.6 | — | — | A |
| EX 15 | Metahalloysite | 97.1 | 0.35 | 77.4 | 0.34 | 17.6 | 30.8 | — | — | A |
| EX 16 | Metahalloysite, γ-Al₂O₃ | 58.9 | 0.27 | 43.4 | 0.26 | 24.0 | 30.3 | — | — | A |

CE: Comparative Example
EX: Example

As is apparent from Table 2 above, the powders of Examples 1 to 16 were all metahalloysite powder. The powders of Examples 1 to 16 each included a granule that was an aggregate of metahalloysite including metahalloysite nanotubes.

In addition, as described above, based on the SEM images and the pore size measurement results, it was confirmed that the first pores derived from the tube holes and the second holes different from the first pores were present in the granules included in the powders of Examples 1 to 16.

Comparing Comparative Example 1 (no firing) with Examples 1 to 4 (firing at 500° C. to 800° C.), there was no big difference in the BJH total pore area and in other measurement values, and it was revealed that the granule structure before firing was maintained even after firing.

In Example 5 (firing at 900° C.), the BJH total pore area and other measurement values slightly decreased as compared to Examples 1 to 4 (firing at 500° C. to 800° C.).

In Example 6 (firing at 1,000° C.), the BJH total pore area and other measurement values further decreased as compared to Examples 1 to 4 (firing at 500° C. to 800° C.).

Similarly, comparing Comparative Example 4 (no firing) with Examples 7 to 10 (firing at 500° C. to 800° C.), for example, there was no big difference in the BJH total pore area and other measurement values, and it was revealed that the granule structure before firing was maintained even after firing.

In Example 11 (firing at 900° C.), the BJH total pore area and other measurement values slightly decreased as compared to Examples 7 to 10 (firing at 500° C. to 800° C.).

Similarly, comparing Comparative Example 6 (no firing) with Examples 12 to 15 (firing at 500° C. to 800° C.), there was no big difference in the BJH total pore area and other measurement values, and it was revealed that the granule structure before firing was maintained even after firing.

In Example 16 (firing at 900° C.), the BJH total pore area and other measurement values slightly decreased as compared to Examples 12 to 15 (firing at 500° C. to 800° C.).

The invention claimed is:

1. Metahalloysite powder comprising a granule that is an aggregate of metahalloysite including a metahalloysite nanotube that is tube-shaped metahalloysite,
   wherein the granule includes a first pore derived from a tube hole of the metahalloysite nanotube, and a second pore different from the first pore,
   wherein a differential pore distribution determined from a nitrogen adsorption isotherm by the BJH method exhibits two or more pore size peaks in a range from 10 to 100 nm,
   wherein an average pore size is not more than 35.7 nm, and
   wherein a total pore volume is not more than 0.41 cm³/q.

2. The metahalloysite powder according to claim 1, wherein an average particle size is from 0.5 to 200 μm.

3. The metahalloysite powder according to claim 1, wherein a BET specific surface area is not less than 10 m²/g.

4. The metahalloysite powder according to claim 1, wherein the average pore size is not less than 11.0 nm.

5. The metahalloysite powder according to claim 1, wherein a total pore area is not less than 12.0 m²/g.

6. The metahalloysite powder according to claim 1, wherein the total pore volume is not less than 0.10 cm³/g.

7. The metahalloysite powder according to claim 1, wherein the granule, after having been immersed in pure water for 24 hours to contain water has a breaking strength of not less than 7.6 MPa.

8. A method of producing the metahalloysite powder according to claim 1, the method comprising:
   a step of preparing a slurry of halloysite containing a halloysite nanotube,
   a step of preparing powder from the slurry, and
   a step of firing the prepared powder at a firing temperature of not lower than 500° C.

9. The method of producing the metahalloysite powder according to claim 8, wherein the step of preparing powder from the slurry is a step of spray-drying the slurry.

* * * * *